No. 694,366. Patented Mar. 4, 1902.
F. B. GIESLER.
ROTARY STEAM DRIER.
(Application filed Oct. 19, 1900.)
(No Model.) 6 Sheets—Sheet 1.

No. 694,366. Patented Mar. 4, 1902.
F. B. GIESLER.
ROTARY STEAM DRIER.
(Application filed Oct. 19, 1900.)
(No Model.) 6 Sheets—Sheet 2.
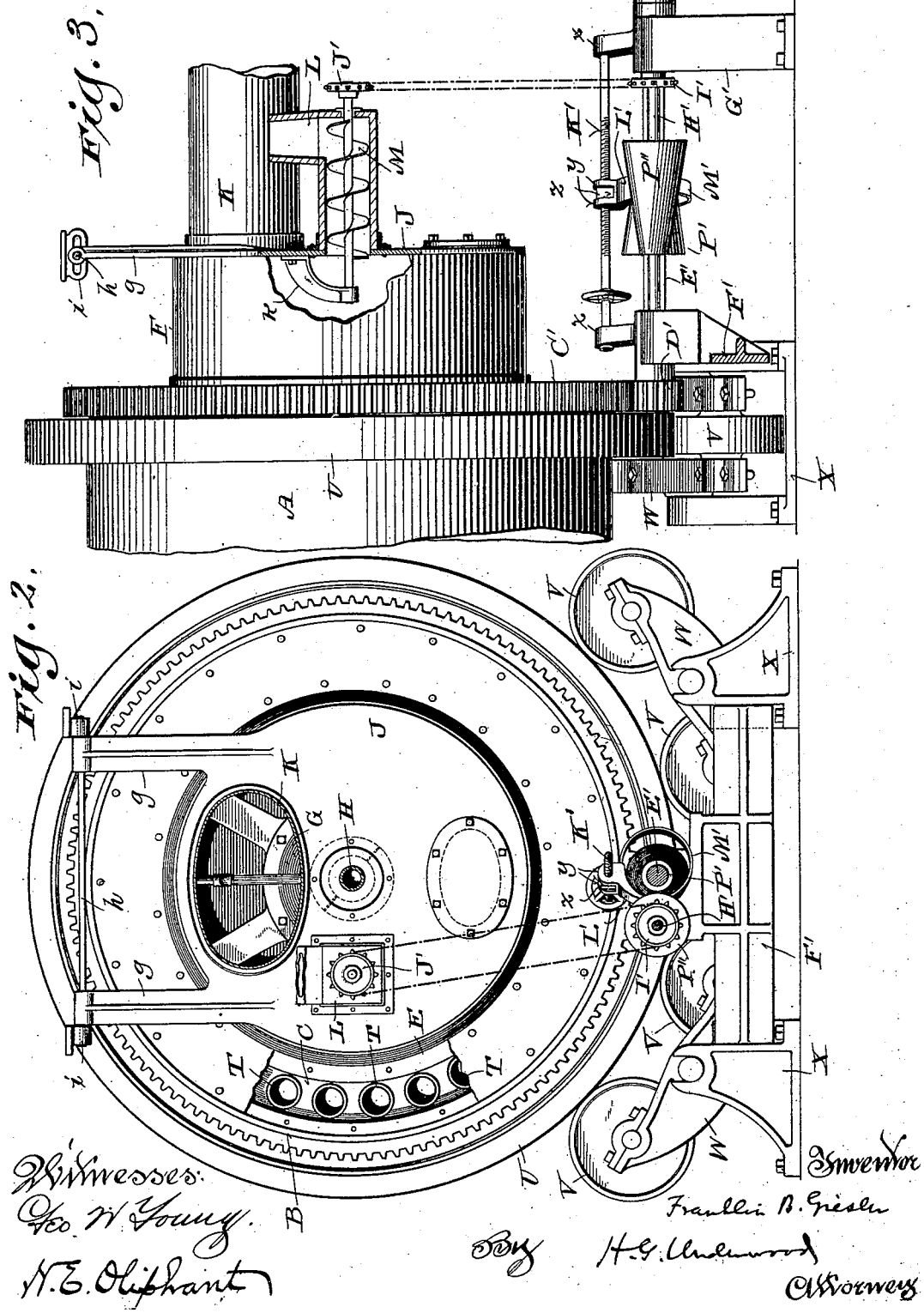

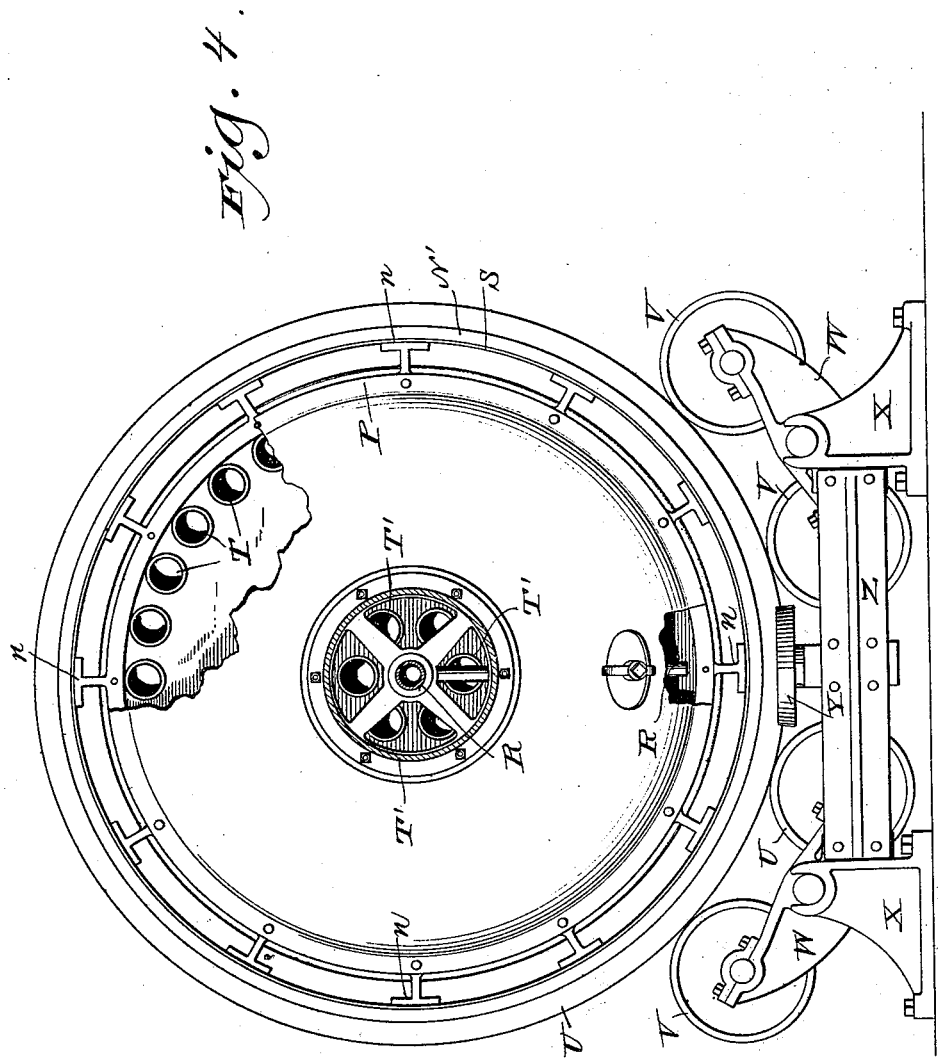

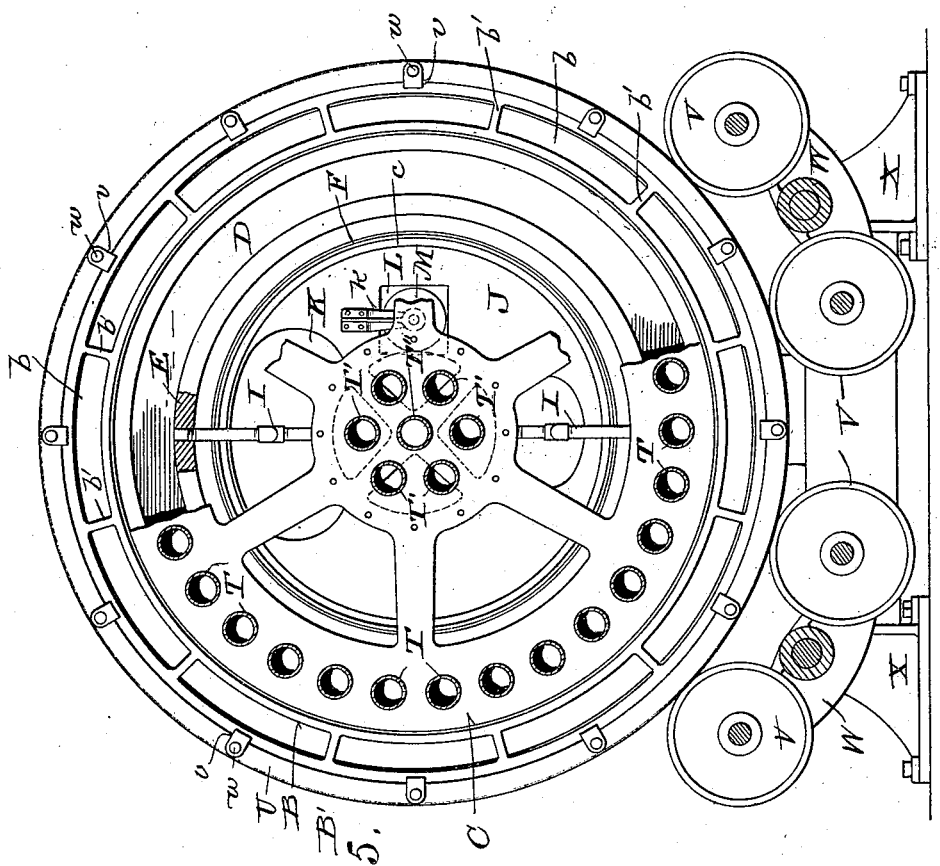

No. 694,366. Patented Mar. 4, 1902.
F. B. GIESLER.
ROTARY STEAM DRIER.
(Application filed Oct. 19, 1900.)
(No Model.) 6 Sheets—Sheet 5.

No. 694,366. Patented Mar. 4, 1902.
F. B. GIESLER.
ROTARY STEAM DRIER.
(Application filed Oct. 19, 1900.)
(No Model.) 6 Sheets—Sheet 6.
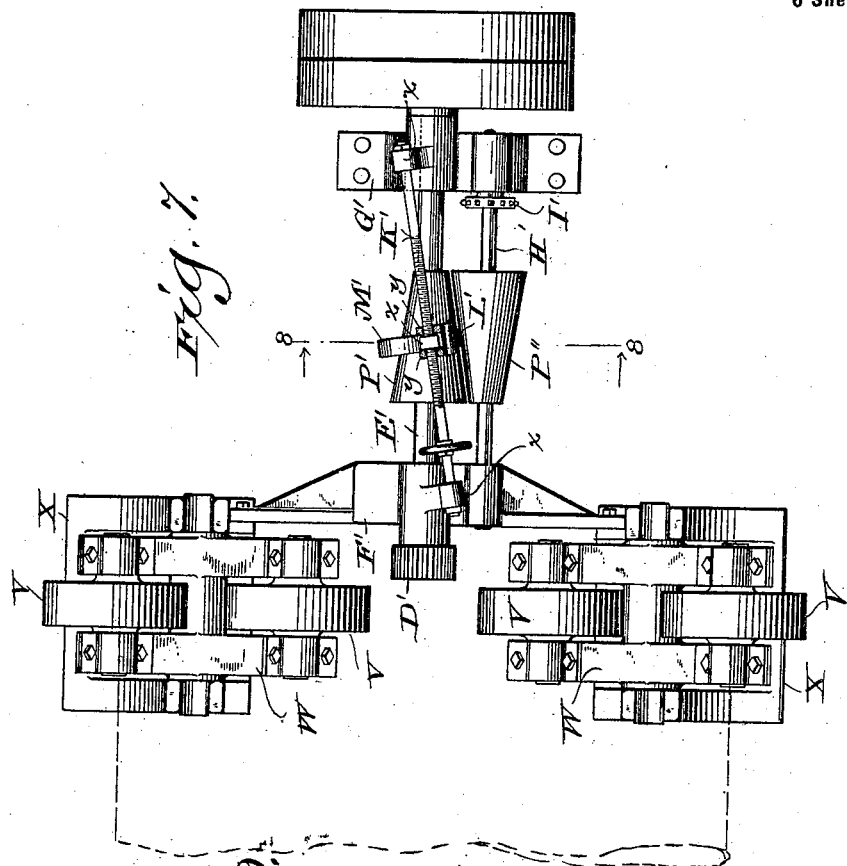
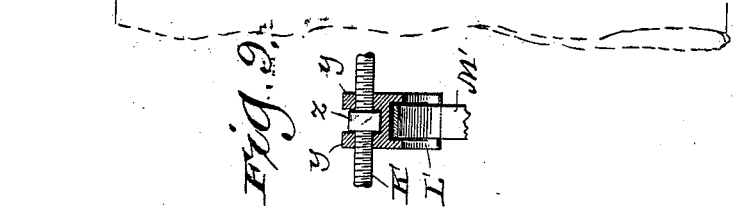
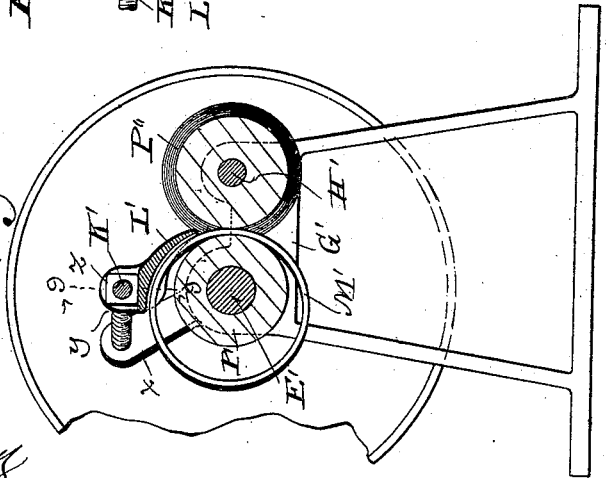

United States Patent Office.

FRANKLIN B. GIESLER, OF MILWAUKEE, WISCONSIN.

ROTARY STEAM-DRIER.

SPECIFICATION forming part of Letters Patent No. 694,366, dated March 4, 1902.

Application filed October 19, 1900. Serial No. 33,551. (No model.)

*To all whom it may concern:*

Be it known that I, FRANKLIN B. GIESLER, a citizen of the United States, and a resident of Milwaukee, in the county of Milwaukee and State of Wisconsin, have invented certain new and useful Improvements in Rotary Steam-Driers; and I do hereby declare that the following is a full, clear, and exact description thereof.

My invention has for its object to provide simple steam-tight rotary driers especially designed for economical treatment of various materials, particularly products of sugar-refineries, glucose-factories, and starch-factories, said invention consisting in certain peculiarities of construction and combination of parts hereinafter set forth with reference to the accompanying drawings and subsequently claimed.

Figure 1:
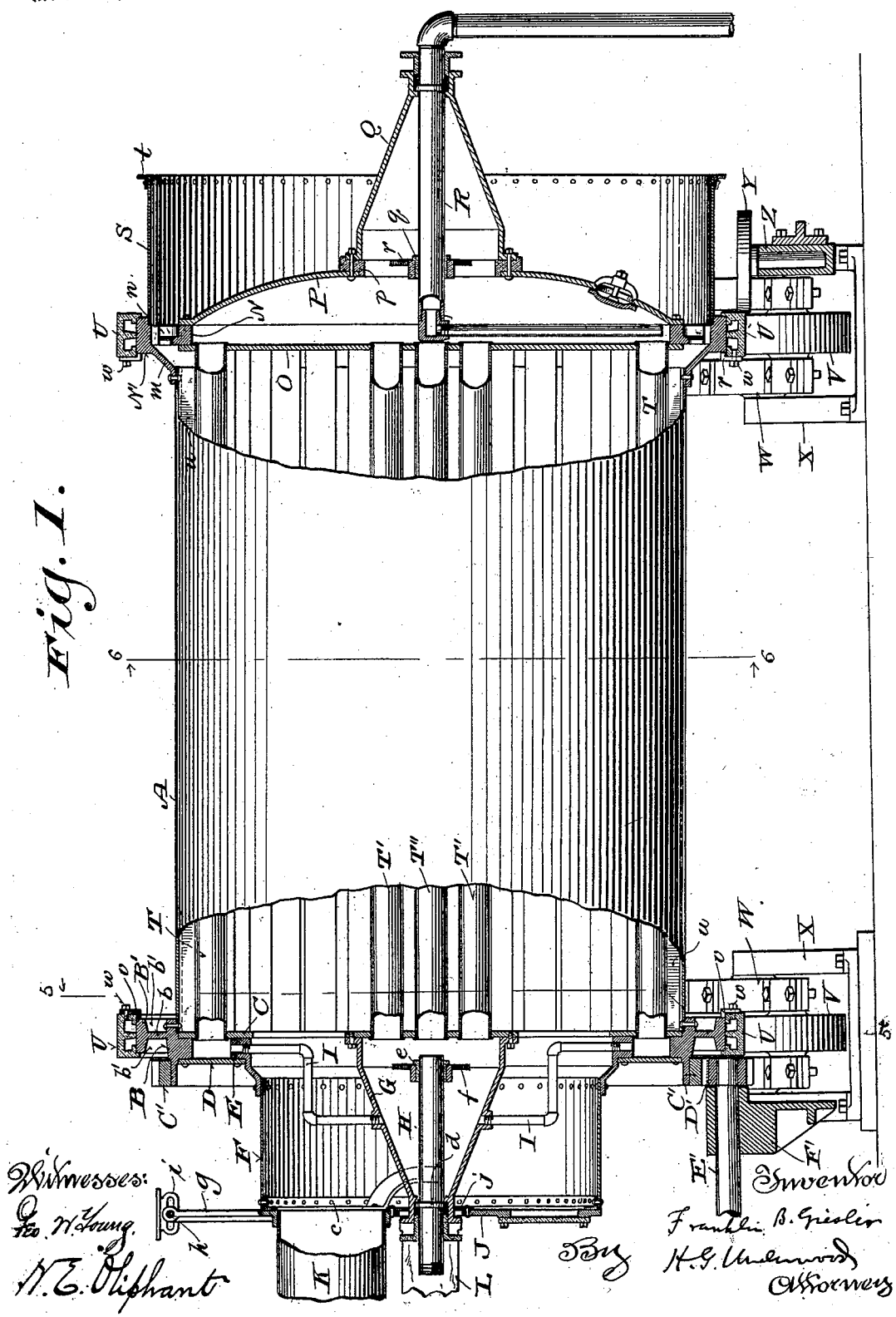
Figure 6:
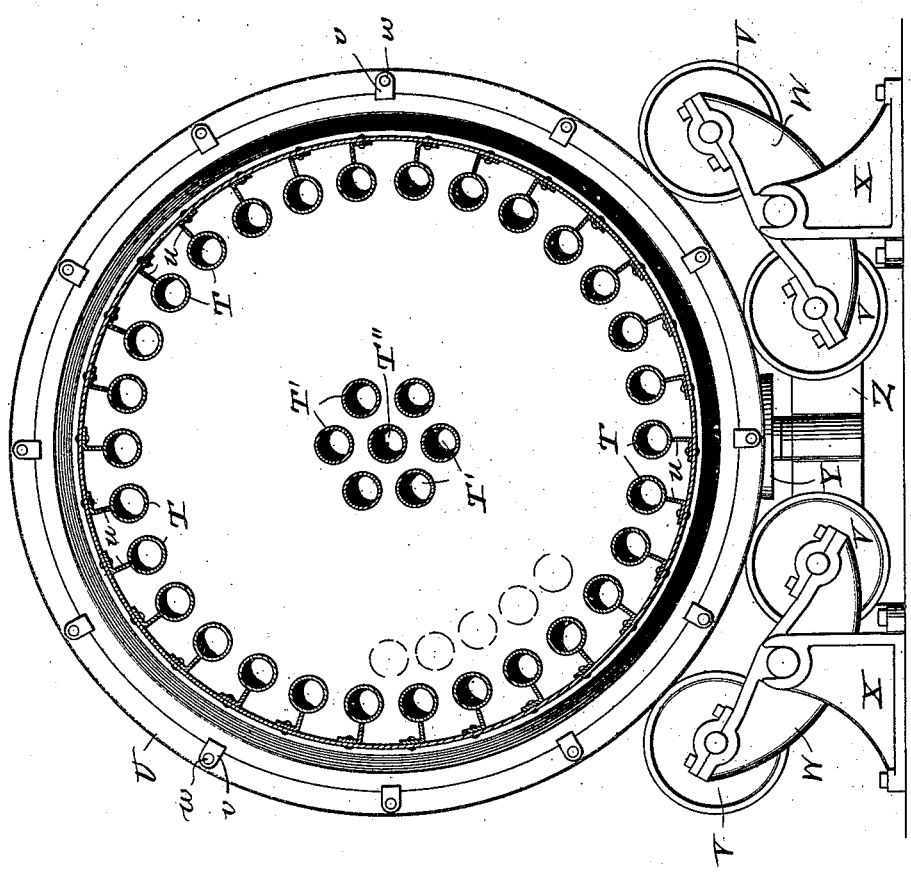

Figure 1 of the drawings represents a side elevation of my improved rotary steam-drier partly broken and in section; Fig. 2, a front elevation of the feed and drive end of the drier partly broken and in section; Fig. 3, a detail side elevation of said feed and drive end of the drier; Fig. 4, a front elevation of the delivery end of said drier; Figs. 5 and 6, sectional views indicated by lines 5 5 and 6 6 in the first figure; Fig. 7, a detail plan view illustrating the drive mechanism and drum-cradles of the drier; Fig. 8, a detail sectional view indicated by line 8 8 in the seventh figure, and Fig. 9 a similar view indicated by line 9 9 in the eighth figure.

Referring by letter to the drawings, I show a drum comprising a cylindrical boiler-iron shell A, having the front end thereof bolted to the inner one of a pair of rings B B', joined by a continuous web $b$ and radial web-braces $b'$, these rings, their connecting-web, and the web-braces being of cast metal in one piece. Facing an inner annular flange of ring B is a radially-apertured steel plate C, that partly closes the adjacent end of shell A, and another steel plate D is made fast to said flange and an annular casting E, that abuts the former plate, whereby a steam-space is provided between said plates. The outer portion of casting E is reduced and made fast to an annular casing F, having a flanged stay-ring $c$ in its free extremity.

Fast on the solid central portion of the radially-apertured plate C is a conical iron chamber G, having a stuffing-box at its outer end of least diameter. The stuffing-box is engaged by a steam-pipe H, having a flange $d$ thereon in said box, and the steam-pipe also engages a bushing $e$ in the central opening of a spider $f$ in the larger portion of the aforesaid conical chamber. Fitting apertures provided in the casting E and chamber G are pipes I, whereby communication is established between said chamber and the steam-space aforesaid.

A metal head J, suspended by arms $g$ from rod $h$, loose in slotted hangers $i$, faces the flange of stay-ring $c$ and closes the outer end of casing F, a split ring $j$, constituting part of said head, being engaged by the stuffing-box end of the conical chamber G aforesaid. Made fast to head J to register with an opening therein is an air-pipe K, and said head is provided with a normally covered manhole through which access may be had to the herein-described drier. A feed-spout L is also made fast to head J to register with an opening therein, and the shaft of a spiral conveyer M has its bearings in an end of the spout and a bracket $k$ upon the inner side of said head, this conveyer being driven at variable speed by the means hereinafter specified or such other means as may be found suitable for the purpose.

The rear end of shell A is bolted to a conical flange $m$ of the outer one of a pair of cast-metal rings N N', the inner ring being provided with a series of radial angle-lugs $n$ at regular intervals apart, that are capable of movement upon the opposing outer ring. Facing the inner side of the ring N is a flat steel plate O, and bolted to the outer side of said ring is an outwardly-dished steel head P, having a central opening engaged by a flange of a spacing-ring $p$, to which and said head is bolted the flanged larger end of a conical iron hood Q, constituting an extension of the expansion-chamber formed by the opposing plate and head aforesaid, said hood having a stuffing-box at its outer end of least diameter. The dished head is provided with a normally-covered hand-hole, through which access is had to the expansion-chamber formed by said head and the opposing plate.

Fitting the stuffing-box end of conical hood

Q and a bushing $q$ in the central opening in a spider $r$ in said hood is a siphon-pipe R, the inner leg of which extends down to nearly the bottom of the space between plate O and head P aforesaid, said pipe being provided with a flange $s$ in said stuffing-box.

Set in the ring N' is an annular apron S of considerable width, and an angle-ring $t$ is bolted to the outer portion of this apron to stiffen same.

Set in apertures of the plates C O are a series of charcoal iron flues T on a circle concentric with the shell A, in which they are contained, and a corresponding series of angle-irons $u$ are bolted to said shell longitudinally thereof to stiffen the same and impinge against the several flues. Another series of charcoal iron flues T' on a circle concentric with shell A, in which they are contained, are set in apertures in the plates C O, and another such flue T'', axially of said shell, is set in apertures of said plates to register with steam-pipe H aforesaid.

Owing to the movable impingement of the angle-lugs $n$ against the ring N' there is automatic compensation for expansion and contraction of the steam-flues.

Tires U of preferably semisteel are detachably connected to the cast-metal rings B' N', each tire being herein shown as provided with a flange lapping one side of the adjacent ring and having angle-clamp brackets $v$ held thereto by screws $w$ to oppose the other side of said ring.

With the exception of head J, the devices in connection therewith, and the siphon-pipe R the general construction and arrangement of parts thus far described constitutes a rotary drum that is set at an inclination to have its tires impinge rollers V, journaled in rockers W, having trunnions supported on base-blocks X, said rollers and rockers constituting self-adjusting cradles for the drum.

The rear end of the drum is lowest, and a stop-wheel Y, having a vertical axle set in a socket of a bar Z, made fast to the rear base-blocks, opposes the adjacent side of the front tire to prevent longitudinal movement of said drum. Should the tires become too much worn or otherwise unserviceable, new ones may be readily substituted at comparatively little expense, it being expected that the drier in general will outlast several pairs of tires.

Fitted tight on ring B is a spur-tooth collar C', engaged by a pinion D' on a drive-shaft E', having its bearings on a bar F', connecting the front base-blocks, and on another block G', this shaft being provided with a fast pulley and a loose pulley, as is clearly illustrated in Fig. 7. The bar F' and block G' are also provided with bearings for a counter-shaft H', in turn provided with a sprocket-wheel I', that has link-belt connection with another sprocket-wheel J' on the shaft of the spiral conveyer above specified.

Arranged to turn in brackets $x$ on the drive-shaft bearings is a screw-rod K', controlled by a hand-wheel fast thereon, and engaging this rod are ears $y$ of a shoe L', a nut $z$ being arranged on said rod between the shoe-ears. The shoe operates as a traveler for a belt M', loose on a cone-pulley P', fast to the drive-shaft, and this belt impinges a similar pulley P'', fast on a counter-shaft H', said pulleys being so disposed that the smaller end of one is adjacent to the larger end of the other. Hence by adjustment of the belt longitudinally of the aforesaid pulleys rotary speed of the conveyer with respect to that of the drum is readily varied as occasion may require. In practice it may be found desirable to have the bearings for the counter-shaft H' adjustable, so as to regulate the space between the cone-pulleys for accommodation of belts M' of variable thickness.

From the foregoing it will be readily understood that the stationary head J automatically adjusts itself to the inclination of the rotary drum and lies snug against the adjacent otherwise open end of same. The material to be dried falls from the feed-spout L into casing F, from where it finds its way through the radial apertures of plate C into shell A to continue on and out of this shell through the spaces between rings N N' onto the apron S, from which it is finally discharged onto a floor or into a convenient receptacle.

While in the shell A the material is exposed to heat radiating from the flues T T' T'', through which steam is circulated at a sufficient pressure. Water of condensation from the steam is caught in the expansion-chamber between plate O and head P and forced out through the siphon-pipe R by the steam-pressure in said chamber.

By means of a suction fan or stack in connection with the pipe K a flow of air is maintained in the drier, and the material under treatment is constantly agitated by being caught between the angle-irons $u$, lifted therewith to a certain elevation and dropped back incidental to the rotary movement of the drum portion of said drier. To increase the heating-surface and drying capacity of the apparatus, it may be desirable to utilize an additional annular series of flues arranged to stagger the flues T, some of such additional flues being indicated by dotted lines in Fig. 6.

Having thus described my invention, what I claim as new, and desire to secure by Letters Patent, is—

1. A drier comprising an inclined rotary drum embodying a cylindrical shell, an annular casting made fast to the high end of the shell, a radially-apertured flat plate abutting the casting, another casting and plate combined with those aforesaid to form a steam-space, a conical central chamber extending in front of the first of said plates and having pipe connection with said steam-space, a steam-pipe in stuffing-box and bushed-spider engagement with said chamber, an annular casing extending in front of the latter of the aforesaid castings, a stationary head constituting a closure for the casing, an air-pipe and a feed-spout in connection with the head, a ring having a conical flange in connection with the low end of the aforesaid shell, another ring having radial lugs impinging the inner face of the former ring, a flat plate abutting the inner side of the lug-ring, an outwardly-dished head made fast to the outer side of said lug-ring, a rear central conical hood having its large end in open connection with the dished head, a siphon-pipe in stuffing-box and bushed-spider engagement with the hood, an annular apron extending rearward from the outermost of the aforesaid rings, a series of flues at intervals of a circle within the shell, angle-irons in connection with said shell impinging said flues, and a cluster of flues central of the aforesaid shell, all the flues being set at their ends in the plates that face the shell ends.

2. A drier comprising an inclined rotary drum embodying a cylindrical shell, an annular casting made fast to the high end of the shell, a radially-apertured flat plate abutting the casting, another casting and plate combined with those aforesaid to form a steam-space, a conical central chamber extending in front of the first of said plates and having pipe connection with said steam-space, a steam-pipe in connection with said chamber central of the same, an annular casing extending in front of the latter of the aforesaid castings, a stationary head constituting a closure for the casing, an air-pipe and a feed-spout in connection with the head, a ring having a conical flange in connection with the low end of the aforesaid shell, another ring having radial lugs impinging the inner face of the former ring, a flat plate abutting the inner side of the lug-ring, an outwardly-dished head made fast to the outer side of said lug-ring, a rear central conical hood having its large end in open connection with the dished head, a siphon-pipe in connection with the hood central of same, an annular apron extending rearward from the outermost of the aforesaid rings, a series of flues at intervals of a circle within the shell, and a cluster of flues central of the aforesaid shell, all the flues being set at their ends in the plates that face the shell ends.

In testimony that I claim the foregoing I have hereunto set my hand, at Milwaukee, in the county of Milwaukee and State of Wisconsin, in the presence of two witnesses.

FRANKLIN B. GIESLER.

Witnesses:
N. E. OLIPHANT,
B. C. ROLOFF.